(12) United States Patent
Baratti et al.

(10) Patent No.: US 12,154,399 B2
(45) Date of Patent: Nov. 26, 2024

(54) COMPUTERIZED SYSTEM FOR ACCESSING TO A VEHICLE AND RELATED METHOD

(71) Applicant: KEYLINE S.P.A., Conegliano (IT)

(72) Inventors: Luca Baratti, Godega di S. Urbano (IT); Elena Bianchi, Cappella Maggiore (IT); Giorgio Sadolfo, Rome (IT)

(73) Assignee: Keyline S.p.A., Conegliano (IT)

( * ) Notice: Subject to any disclaimer, the term of this patent is extended or adjusted under 35 U.S.C. 154(b) by 76 days.

(21) Appl. No.: 17/874,479

(22) Filed: Jul. 27, 2022

(65) Prior Publication Data

US 2022/0366744 A1 Nov. 17, 2022

Related U.S. Application Data

(63) Continuation of application No. PCT/IB2021/050578, filed on Jan. 26, 2021.

(51) Int. Cl.
*G07C 9/00* (2020.01)
*B60W 50/10* (2012.01)

(52) U.S. Cl.
CPC ......... *G07C 9/00309* (2013.01); *B60W 50/10* (2013.01); *G07C 2009/00603* (2013.01); *G07C 2009/00769* (2013.01)

(58) Field of Classification Search
CPC ...... G07C 9/00309; G07C 2009/00603; G07C 2009/00769; B60R 25/24
See application file for complete search history.

(56) References Cited

U.S. PATENT DOCUMENTS

| | | | |
|---|---|---|---|
| 10,068,402 B2 | 9/2018 | Stanfield et al. | |
| 2013/0259232 A1 | 10/2013 | Petel | |
| 2015/0175127 A1 | 6/2015 | Hatton | |
| 2015/0363988 A1* | 12/2015 | Van Wiemeersch | H04W 4/40 455/557 |
| 2016/0019738 A1 | 1/2016 | Kim | |
| 2018/0257606 A1* | 9/2018 | Weghaus | G07C 9/00174 |
| 2019/0047512 A1* | 2/2019 | Gersabeck | B60R 25/24 |
| 2020/0148167 A1* | 5/2020 | Gersabeck | B60R 25/246 |

OTHER PUBLICATIONS

International Search Authority: European Patent Office for corresponding International Patent Application No. PCT/IB2021/050578 dated May 12, 2021, 5 pages.

* cited by examiner

*Primary Examiner* — Nabil H Syed
(74) *Attorney, Agent, or Firm* — Patterson Intellectual Property Law, PC

(57) ABSTRACT

A computerized system as disclosed herein for accessing a vehicle comprises a vehicle key comprising a control unit, a first wireless communication module operatively connected to said control unit and configured to allow said control unit to communicate with a control system of said vehicle, and a second wireless communication module operatively connected to said control unit and configured to allow said control unit to communicate with a mobile computerized device. The system further comprises a software application which can be stored on and executed by at least one mobile computerized device, said software application being configured to control said control unit to interact with said control system to cause the unlocking of one or more doors of said vehicle. In a further aspect, the invention relates to a computerized method for accessing to a vehicle.

20 Claims, 1 Drawing Sheet

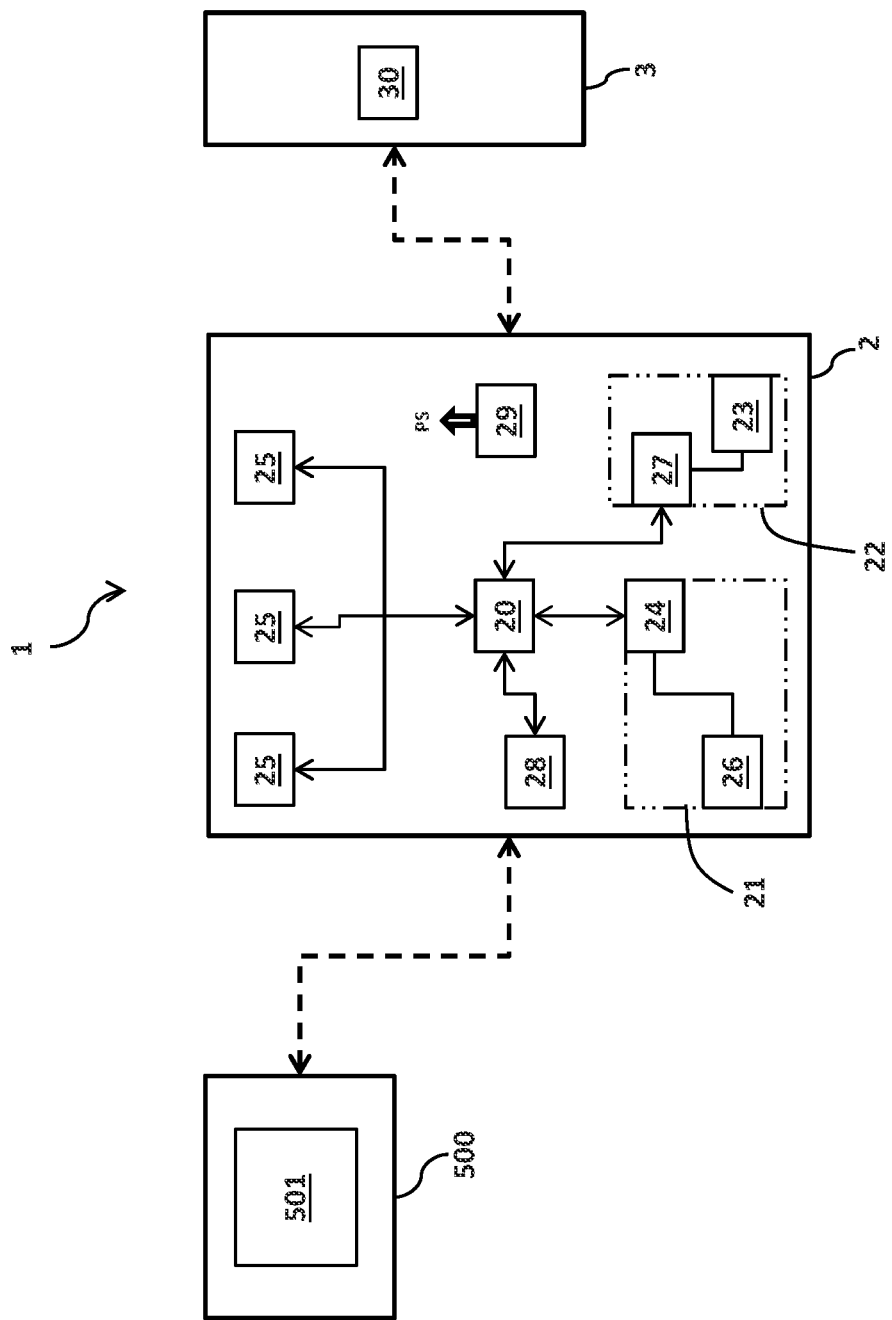

COMPUTERIZED SYSTEM FOR ACCESSING TO A VEHICLE AND RELATED METHOD

CROSS-REFERENCES TO RELATED APPLICATIONS

This application is a continuation of International Application Number PCT/IB2021/050578, filed Jan. 26, 2021, which further claims priority of Italian Patent Application Number 102020000001516, filed Jan. 27, 2020, each of which is hereby incorporated by reference in its entirety.

FIELD OF THE INVENTION

The present invention relates to a computerized system and to a method for accessing a vehicle.

BACKGROUND

As is known, computerized systems are currently available for keyless access to a vehicle.

These technical solutions, described for example in the patent documents U.S. Pat. No. 9,460,577B2, US2019/0110199A1 and US2016/0019738A1, are normally widely used for the implementation of vehicle rental or car sharing services.

In general, in computerized systems of this type, the user receives a specific identification code (typically called "electronic key") on a mobile computerized device (for example a smartphone) and transmits this identification code to a specific electronic device installed on the vehicle.

This electronic device interacts with the control system of the vehicle for recognition of the identification code. Once the identification code has been recognised, the control system of the vehicle controls unlocking of the doors and enables the engine of the vehicle to start.

Computerized system for accessing to a vehicle of known type are relatively laborious and costly to implement in a practical manner.

As illustrated above, they normally require the installation of a dedicated electronic device on each vehicle. This device is relatively costly to produce on an industrial scale, given that it must be capable of communicating and coacting with the control unit of the vehicle and with an external mobile computerized device to allow a user to access the vehicle.

Moreover, often a specific server network is provided to manage the identification codes to be sent to users.

The patent document U.S. Pat. No. 10,068,402B2 describes an upgrade kit intended to be coupled to the key of a vehicle to modify its functions and make this key suitable for use in car sharing or similar systems.

Solutions of this type have some drawbacks.

Firstly, they are relatively complex to implement in a practical manner.

In fact, in order to ensure correct interaction with the vehicle, the upgrade kit must necessarily be able to inhibit some basic functions of the original key, such as the immobilizer function (via transponder).

Moreover, these devices are difficult to manage, above all with regard to the methods of sharing the aforesaid upgrade kit between several users and the related method of enabling use.

In light of the problems set forth above, in the state of the art there is a need for new solutions that facilitate the management of accessing to a vehicle by means of a computerized system, making it relatively simple and inexpensive.

BRIEF SUMMARY

The present invention intends to meet this need by providing a computerized system for accessing to a vehicle.

In a general definition thereof, the computerized system according to the invention comprises a vehicle key comprising a control unit, a first wireless communication module operatively connected to said control unit and adapted to allow said control unit to communicate with a control system of said vehicle and a second wireless communication module operatively connected to said control unit and adapted to allow said control unit to communicate with a mobile computerized device.

Preferably, said first communication module is a communication module for radio frequency communications.

Preferably, said second communication module is a communication module for local communications, more preferably a Bluetooth™ communication module.

Preferably, said vehicle key comprises one or more control buttons adapted to allow a user to send control signals to said control unit.

Preferably, said key comprises a third wireless communication module operatively connected to said control unit and adapted to allow said control unit to communicate with a control system of said vehicle even in the absence of a power supply for the internal components of said key.

The computerized system according to the invention comprises a software application which can be stored on and executed by at least one mobile computerized device (which can be of known type).

According to the invention, this software application is configured to control said control unit to interact with said control system to cause the unlocking of one or more doors of said vehicle.

Preferably, said software application is configured to control said control unit to interact with said control system to cause the locking of one or more doors of said vehicle.

Preferably, said software application is configured to control said control unit to interact with said control system to prevent the unlocking of one or more predefined doors of said vehicle.

According to an aspect of the invention, said software application is configured to control said control unit to interact with said control system to prevent the engine of said vehicle from starting.

According to an aspect of the invention, said software application is configured to disable one or more of the control buttons of said vehicle key.

In a further aspect thereof, the present invention relates to a vehicle key as set forth below.

The key comprises a control unit, a first wireless communication module adapted to allow said control unit to communicate with a second control unit on said vehicle and a second wireless communication module adapted to allow said control unit to communicate with at least one mobile computerized device.

According to the invention, said mobile computerized device is capable of storing and executing a dedicated software application.

According to the invention, the control unit of said vehicle key is configured to receive control signals from said software application, when this latter is executed by said mobile computerized device.

The control unit of the aforesaid vehicle key is configured to interact with said control system to cause the unlocking of one or more doors of said vehicle, in response to the reception of control signals sent by said software application.

In a further aspect thereof, the present invention relates to a method for accessing to a vehicle which comprises: providing a key for said vehicle comprising a control unit, a first wireless communication module operatively connected to said control unit and adapted to allow said control unit to communicate with a control system of said vehicle and a second wireless communication module operatively connected to said control unit and adapted to allow said control unit to communicate with a mobile computerized device; and providing a software application which can be stored on and executed by at least one mobile computerized device, said software application being configured to control said control unit to interact with said control system to cause the unlocking of one or more doors of said vehicle.

The computerized system and the method according to the invention provide a simple and versatile solution for accessing to a vehicle.

This solution provides that the user can interact with the vehicle by means of a software application (installable on a mobile computerized device, for example a smartphone) capable of sending suitable control signals to the key of the vehicle.

Unlike prior art solutions, in the computerized system and the method according to the invention no dedicated electronic devices are installed on the vehicle.

According to the invention, the key of the vehicle forms the means with which the user can interact with the vehicle by means of a mobile computerized device.

The computerized system and the method according to the invention can advantageously be used in the private sector, in order to improve the security and comfort of use of a vehicle.

The computerized system and the method according to the invention are particularly suitable for implementing services for managing corporate vehicle fleets, vehicle rental services and car sharing services.

BRIEF DESCRIPTION OF THE SEVERAL VIEWS OF THE DRAWINGS

Further features and advantages of the present invention will be better perceived by referring to the description given below and to the accompanying drawings, provided purely for non-limiting illustrative purposes, wherein the single FIG. 1 schematically illustrates the computerized system according to the invention.

DETAILED DESCRIPTION

With reference to the aforesaid FIGURE, the present invention relates to a computerized system 1 for accessing a vehicle 500.

The vehicle 500 comprises a control system 501 capable of controlling its functions. This control system comprises, for example, an ECU (Engine Control Unit) and other suitable control modules that interact therewith.

In general, the vehicle 500 can be of known type. Therefore, for obvious reasons of brevity, only the aspects that are relevant for the invention shall be described below.

Preferably, the vehicle 500 is a motor vehicle provided with a passenger compartment, for example a car.

However, the invention could be advantageously applied to vehicles of different type, for example open motor vehicles (motorcycles, sidecars, and the like) provided with a lockable storage compartment or luggage compartment.

The computerized system 1 advantageously comprises a vehicle key 2. In general, the key 2 is a smart key, i.e., a key that interacts according to a wireless mode with the control system 501 of the vehicle.

For example, the key 2 can be of the type with a serrated blade to be inserted into a lock to start the engine of the vehicle or unlock the doors or can be of a remote-control type.

The key 2 comprises a control unit 20 preferably comprising at least one digital processing device, for example a microprocessor capable of executing suitable software instructions stored in a storage medium to execute the functions required for the key.

Preferably, the key 2 comprises a first wireless communication module 21 operatively connected to the control unit 20.

The communication module 21 is advantageously arranged to allow the control unit 20 to communicate with the control system 501 of the vehicle.

Preferably, the communication module 21 is a communication module for radio frequency communications.

Preferably, the communication module 21 comprises a radio antenna 26 operatively connected to a transceiver 24 (for example operating in the UHF band at 315, 433 or 868 MHz) operatively connected to the antenna 26 and to the control unit 20.

According to some variants of the invention, the transceiver 24 can be at least partially integrated in the control unit 20.

In general, the communication module 21 can be of known type and shall not be described in further detail for obvious reasons of brevity.

The same interaction between the control unit 20 and the control system 501 of the vehicle 500 can take place according to known methods, widely used for controlling motor vehicles. These methods of interaction shall not be described in detail herein for reasons of brevity.

Preferably, the key 2 comprises a second wireless communication module 22 operatively connected to the control unit 20.

The communication module 22 is advantageously arranged to allow the control unit 20 to communicate (locally) with the mobile computerized device (not belonging to the vehicle 500), for example a smartphone, a tablet or the like.

Preferably the communication module 22 comprises an antenna for local communications 23 and a local controller 27 (for example a microprocessor) operatively connected to the antenna 23 and to the control unit 20.

Preferably, the communication module 22 is capable of implementing local, or proximity based, communication protocols, such as Wi-Fi™, Bluetooth™ or similar communication protocols.

Preferably, the communication module 22 is a communication module of Bluetooth™ type.

In general, the communication module 22 can be of known type and shall not be described in further detail herein for reasons of brevity.

The interaction between the control unit 20 and the mobile computerized device 3 can also take place according to known methods, widely used in proximity-based communications between electronic devices. These interaction methods shall not be described in further detail herein for reasons of brevity.

Preferably, the key 2 comprises a third wireless communication module 28 electrically connected to the control unit 20.

Preferably, the communication module 28 comprises a passive electronic circuit (RFID antenna) for radio frequency communications (for example 124-134 kHz).

The communication module 28 is advantageously arranged to allow the control unit 20 to communicate with the control system 501 of the vehicle also in the absence of a power supply for the internal components of the key.

The communication module 28 allows the implementation, in the absence of a power supply, of some basic functions for controlling the vehicle, for example the immobilizer function.

Preferably, the key 2 comprises one or more control buttons 25 adapted to allow a user to send control signals to the control unit 20, for example a door unlocking control, a luggage compartment unlocking control, and so forth.

The control buttons 25 are operatively connected to the control unit 20.

In response to manual operation by a user, the control buttons 25 are capable of sending suitable control signals to the control unit 20.

In response to these control signals, the control unit 20 interacts with the control system 501 of the vehicle to execute some predefined functions, such as unlocking the doors or the luggage compartment.

Advantageously, the control buttons 25 can be configured according to various functions during programming (firmware) of the control unit 20.

Preferably, the key 2 comprises a battery and an electronic power supply circuit 29 intended to provide a power supply PS for some electronic components of the key, for example the control unit 20 and the communication modules 21, 22.

In general, these latter components of the key 2 can be of known type and shall not be described in detail herein for obvious reasons of brevity.

According to the invention, the computerized system 1 comprises a software application 30 which can be stored on and executed by at least one mobile computerized device 3.

In general, the mobile computerized device 3 (which itself may not form a part of the computerized system 1) can be of any type, for example a smartphone, a tablet or the like.

The computerized device 3 advantageously comprises one or more communication ports for local wireless communications, for example Wi-Fi™, Bluetooth™ or similar communication ports.

According to the invention, the software application 30 is configured to send control signals to the key 2, when executed by the mobile computerized device 3.

In response to these control signals, the control unit 20 executes some predefined functions. In particular, it interacts with the control system 501 of the vehicle to cause the unlocking of one or more doors of the vehicle.

Due to the interaction between the software application 30 (when executed on mobile computerized device) and the key 2, the user can therefore access the vehicle 500, without having the aforesaid key.

The function of the computerized system 1 illustrated above can be widely applied in all those situations in which the same vehicle is to be shared by several users, as is the case when providing car rental services, services for the management of corporate vehicle fleets or car sharing services.

For example, the key 2 can be left inside the locked vehicle. To access the vehicle, the user can advantageously use a smartphone to communicate with the key and cause the unlocking of one or more doors.

The function of the computerized system 1 illustrated above can also be widely applied in a private or domestic sector.

For example, a user who does not intend to carry the key can leave it inside the passenger compartment. To access the vehicle again, the user can control the unlocking of the doors of the vehicle via smartphone.

Preferably, the software application 30 is configured to control the control unit 20 of the key 2 to interact with the control system 501 of the vehicle 500 to control the locking of one or more doors.

This function of the computerized system 1 can be applied in situations in which it is desirable for the user to be allowed to lock the vehicle without using the key, for example leaving the key in the vehicle. It is particularly useful in the case in which the doors are provided with a motorized locking device.

Preferably, the software application 30 is configured to control the control unit 20 of the key 2 to interact with the control system 501 of the vehicle 500 to prevent the unlocking of one or more doors of the vehicle.

This function of the computerized system 1 can be applied in situations in which it is desirable for the user to be allowed access only to some areas of the vehicle.

For example, the software application can be configured so that the user can control the unlocking of only some doors via smartphone to allow the user only to access the passenger compartment without being able to access the luggage compartment, or vice versa.

According to another aspect of the invention, the software application 30 is configured to control the control unit 20 of the key 2 to interact with the control system 501 of the vehicle to prevent the vehicle engine from starting.

Due to this function of the computerized system 1, a user may or may not be authorised to use the vehicle after gaining access to it.

This function of the computerized system 1 can be widely applied in all those situations in which it is desirable to control security with regard to the use of a vehicle on the road.

For example, in the domestic field, it may be desirable to implement a sort of parental control in relation to the use of a vehicle. Via the software application 30, the user can control the key of the vehicle 2 to interact with the control system of the vehicle 501 to prevent the engine from starting so as to prevent a minor from using the vehicle.

According to another aspect of the invention, the software application 30 is configured to disable one or more of the control buttons 25 of the key.

Due to this function of the computerized system 1, a user can be enabled to used only some control buttons of the key 2.

From the above, it is evident how the present invention also relates to a key 2 for a vehicle having the structure and the functions described above.

According to the invention, the control unit 20 is configured to receive control signals from the software application 30, when this latter is executed by the mobile computerized device 3.

According to the invention, the control unit 20 is configured to interact with the control system 501 of the vehicle to control the unlocking of one or more doors of said vehicle, in response to the reception of said control signals sent by the software application 30.

In a further aspect thereof, the present invention relates to a method for accessing to a vehicle 500.

The method according to the invention, comprises: providing a key 2 for the vehicle 500 having the configuration and the functions illustrated above; providing a software application 30 which can be stored on and executed by at least one mobile computerized device 3. This software application is configured to control the control unit 20 of the key 2 to interact with the control system 501 of the vehicle to control the unlocking of one or more doors of said vehicle.

It has been found in practice how the present invention offers numerous advantages with respect to prior art computerized systems for accessing to a vehicle.

The particular feature of the computerized system according to the invention consists in the possibility of interacting, via a mobile computerized device capable of executing a suitable software application, with the key 2 of the vehicle 500 to perform some predefined functions, in particular the unlocking of the doors.

It is evident how the computerized system according to the invention differs completely from prior art solutions.

In fact, in these latter dedicated electronic devices, distinct from the key of the vehicle and not interacting therewith, are installed on the vehicle. The computerized system according to the invention can be widely used in the private and domestic sector. It can be advantageously used to improve the security and the comfort of use of a vehicle.

The computerized system according to the invention can also be widely used in the commercial or industrial sector.

It is particularly suitable for the management of corporate vehicle fleets or to provide vehicle rental or car sharing services.

The computerized system according to the invention is relatively simple and inexpensive to implement on a practical level.

The key 2 can be produced using methods for producing electronic circuits of known type. The control unit 20 can be easily configured to communicate with a mobile computerized device and to perform the functions illustrated above.

Also the software application 30 can be easily implemented, configured, managed and made available for installation on a computerized device 3 according to known methods, for example so as to be compatible with Windows™, Android™ and iOS™ operating systems and/or so as to be easily downloaded from an application store.

What is claimed is:

1. A computerized system for accessing a vehicle, the system comprising:
   a key for said vehicle comprising a control unit, a first wireless communication module operatively connected to said control unit and configured to allow said control unit to communicate with a control system of said vehicle, and a second wireless communication module operatively connected to said control unit and configured to allow said control unit to communicate with a mobile computerized device;
   a software application stored upon and executed by at least one mobile computerized device, said software application being configured to control said control unit to interact with said control system to cause the unlocking of one or more doors of said vehicle, independent of the key being located inside or outside of the vehicle, and wherein the one or more doors to be unlocked are selected as user input via the software application,
   wherein no dedicated electronic devices of the computerized system are mounted on the vehicle.

2. The computerized system of claim 1, wherein said software application is configured to control said control unit to interact with said control system to cause the locking of one or more predefined doors of said vehicle.

3. The computerized system of claim 1, wherein said software application is configured to control said control unit to interact with said control system to prevent the unlocking of one or more predefined doors of said vehicle.

4. The computerized system of claim 1, wherein said software application is configured to control said control unit to interact with said control system to prevent an engine of said vehicle from starting.

5. The computerized system of claim 1, wherein said key comprises one or more control buttons configured to allow a user to send control signals to said control unit, said software application being configured to disable one or more of said control buttons.

6. The computerized system of claim 1, wherein said first communication module is a communication module for radio frequency communications and wherein the second communication module is a communication module for local wireless communications.

7. The computerized system of claim 1, wherein said key comprises a third wireless communication module operatively connected to said control unit and configured to allow said control unit to communicate with a control system of said vehicle also in the absence of a power supply for internal components of said key.

8. A key for a vehicle, comprising:
   a first control unit;
   a first wireless communication module configured to allow said control unit to communicate with a control system of said vehicle;
   a second wireless communication module configured to allow said control unit to communicate with a mobile computerized device having an executable software application residing thereon,
   wherein said control unit is configured to receive control signals from said software application, and further responsive to said control signals to interact with said control system to cause the unlocking of one or more doors of said vehicle, independent of the key being located inside or outside of the vehicle,
   wherein the one or more doors to be unlocked are selected as user input via the software application, and
   wherein the first wireless communication module operates at a first frequency range, the second wireless communication module operates at a second frequency range and wherein the first frequency range and the second frequency range do not overlap.

9. The key of claim 8, wherein said control unit is responsive to said control signals to interact with said control system to cause the locking of one or more predefined doors of said vehicle.

10. The key of claim 8, wherein said control unit is responsive to said control signals to interact with said control system to prevent the unlocking of one or more predefined doors of said vehicle.

11. The key of claim 8, wherein said control unit is responsive to said control signals to interact with said control system to prevent an engine of said vehicle from starting.

12. The key of claim 8, comprising one or more control buttons configured to allow a user to send control signals to said control unit, one or more of said control buttons being selectively disabled responsive to said control signals.

13. The key of claim 8, wherein said first communication module is a communication module for radio frequency communications.

14. The key of claim 8, wherein said second communication module is a communication module for local wireless communications.

15. The key of claim 8, comprising a third wireless communication module operatively connected to said control unit and configured to allow said control unit to communicate with a control system of said vehicle also in the absence of a power supply for internal components of said key.

16. A method for accessing a vehicle, comprising:
providing a key for said vehicle comprising a control unit, a first wireless communication module operatively connected to said control unit and configured to allow said control unit to communicate with a control system of said vehicle, and a second wireless communication module operatively connected to said control unit and adapted to allow said control unit to communicate with a mobile computerized device;
executing a software application via at least one mobile computerized device; and
responsive to execution of said software application, controlling said control unit to interact with said control system to cause the unlocking or locking of one or more doors of said vehicle, independent of the key being located inside or outside of the vehicle,
wherein the one or more doors to be unlocked are selected as user input via the software application, and
wherein the first wireless communication module operates at a first frequency range, the second wireless communication module operates at a second frequency range and wherein the first frequency range and the second frequency range do not overlap.

17. The method of claim 16, comprising controlling said control unit to interact with said control system to cause the locking of one or more predefined doors of said vehicle.

18. The method of claim 16, comprising controlling said control unit to interact with said control system to prevent the unlocking of one or more predefined doors of said vehicle.

19. The method of claim 16, comprising controlling said control unit to interact with said control system to prevent an engine of said vehicle from starting.

20. The computerized system of claim 6, wherein the first communication module operates at a first frequency range and the second communication module operates at a second frequency range that does not overlap the first frequency range.

* * * * *